US009965872B2

(12) United States Patent
Yashiro et al.

(10) Patent No.: US 9,965,872 B2
(45) Date of Patent: May 8, 2018

(54) DISPLAY PROCESSING TERMINAL DEVICE, PHOTOSENSOR-EQUIPPED UNIT, AND PHOTOMETRIC SYSTEM

(71) Applicant: KONICA MINOLTA, INC., Chiyoda-ku (JP)

(72) Inventors: Takehiro Yashiro, Hirakata (JP); Yuta Yamanoi, Toyonaka (JP); Kouichi Ishida, Sakai (JP); Keizou Ochi, Nishinomiya (JP); Noriaki Matsubara, Sakai (JP); Satoshi Yokota, Toyonaka (JP)

(73) Assignee: Konica Minolta, Inc., Tokyo (JP)

( * ) Notice: Subject to any disclaimer, the term of this patent is extended or adjusted under 35 U.S.C. 154(b) by 0 days. days.

(21) Appl. No.: 14/389,342

(22) PCT Filed: Feb. 19, 2013

(86) PCT No.: PCT/JP2013/053954
§ 371 (c)(1),
(2) Date: Sep. 29, 2014

(87) PCT Pub. No.: WO2013/145938
PCT Pub. Date: Oct. 3, 2013

(65) Prior Publication Data
US 2015/0109317 A1  Apr. 23, 2015

(30) Foreign Application Priority Data
Mar. 27, 2012  (JP) ................................ 2012-070575

(51) Int. Cl.
*G06T 11/00*  (2006.01)
*G09G 3/16*  (2006.01)
(Continued)

(52) U.S. Cl.
CPC .......... *G06T 11/001* (2013.01); *G06F 1/1626* (2013.01); *G06F 3/14* (2013.01);
(Continued)

(58) Field of Classification Search
None
See application file for complete search history.

(56) References Cited

U.S. PATENT DOCUMENTS

| 6,693,612 | B1 * | 2/2004 | Matsumoto | G09G 3/3413 345/102 |
|---|---|---|---|---|
| 7,932,882 | B2 | 4/2011 | Shimotono et al. | |
| 2002/0109664 | A1 * | 8/2002 | Shimada | G09G 3/3406 345/102 |
| 2008/0129666 | A1 * | 6/2008 | Shimotono | G06F 1/162 345/87 |
| 2010/0157574 | A1 * | 6/2010 | Shin | G02B 6/0091 362/97.1 |
| 2013/0027356 | A1 | 1/2013 | Nishida | |

(Continued)

FOREIGN PATENT DOCUMENTS

| JP | 11-239670 | 9/1999 |
|---|---|---|
| JP | 2005-340918 | 12/2005 |

(Continued)

OTHER PUBLICATIONS

Office Action dated Jun. 14, 2016 which issued in the corresponding European Patent Application No. 13767319.0.

*Primary Examiner* — Michelle Chin
(74) *Attorney, Agent, or Firm* — Cozen O'Connor

(57) ABSTRACT

In a photometric system, a photosensor-equipped unit includes a transmission information holding portion that holds transmission information relating to a screen display direction of a display portion with a content suitable for a photosensor. When the photosensor-equipped unit is connected to a display processing terminal device, the photosensor-equipped unit can transmit the transmission information to the display processing terminal device. The display processing terminal device includes a screen display control portion that executes a display direction setting process during connection for setting a screen display direction of the display portion based upon the transmission information.

11 Claims, 8 Drawing Sheets

(51) Int. Cl.
*G09G 5/00* (2006.01)
*G09G 5/36* (2006.01)
*G06F 3/14* (2006.01)
*G09G 3/20* (2006.01)
*G06F 1/16* (2006.01)

(52) U.S. Cl.
CPC ................ *G09G 3/16* (2013.01); *G09G 3/20* (2013.01); *G09G 5/00* (2013.01); *G09G 5/36* (2013.01); *G06F 2200/1614* (2013.01); *G06F 2200/1637* (2013.01); *G09G 2320/0242* (2013.01); *G09G 2320/068* (2013.01); *G09G 2320/0666* (2013.01); *G09G 2340/0492* (2013.01); *G09G 2354/00* (2013.01); *G09G 2360/144* (2013.01); *G09G 2370/22* (2013.01); *G09G 2380/14* (2013.01)

(56) References Cited

U.S. PATENT DOCUMENTS

2013/0176482 A1* 7/2013 Hirasawa ................ G03B 7/16
348/370

FOREIGN PATENT DOCUMENTS

| JP | 2008-139711 | 6/2008 |
| JP | 2009-141484 | 6/2009 |
| JP | 2010-176025 | 8/2010 |
| JP | 2012-48027 | 3/2012 |
| WO | WO 2011/129136 | 10/2011 |

* cited by examiner

F I G . 1 0
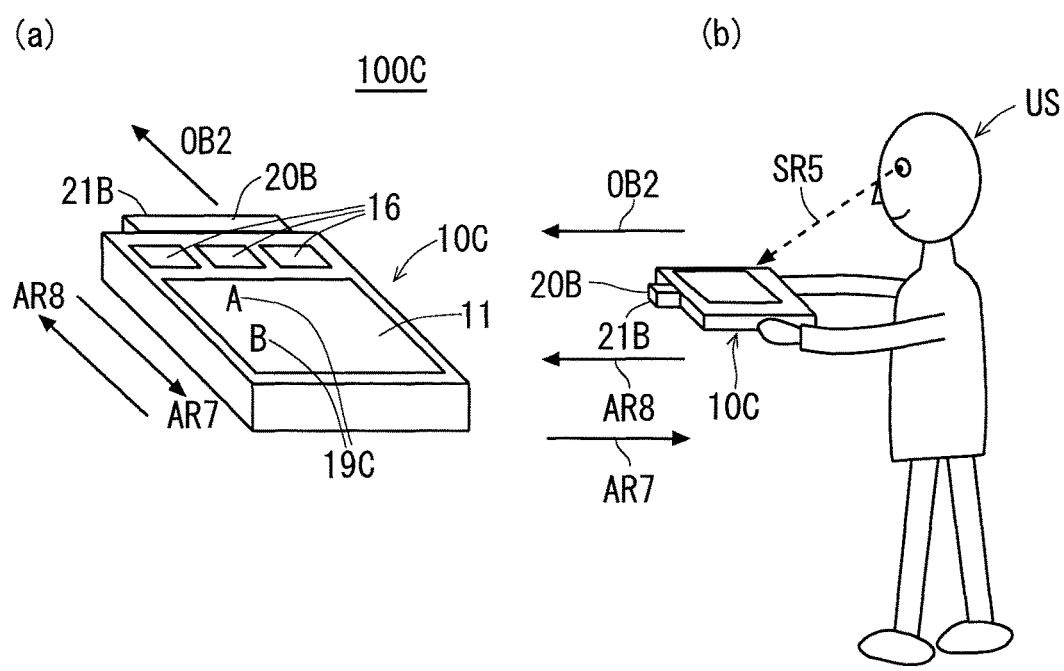

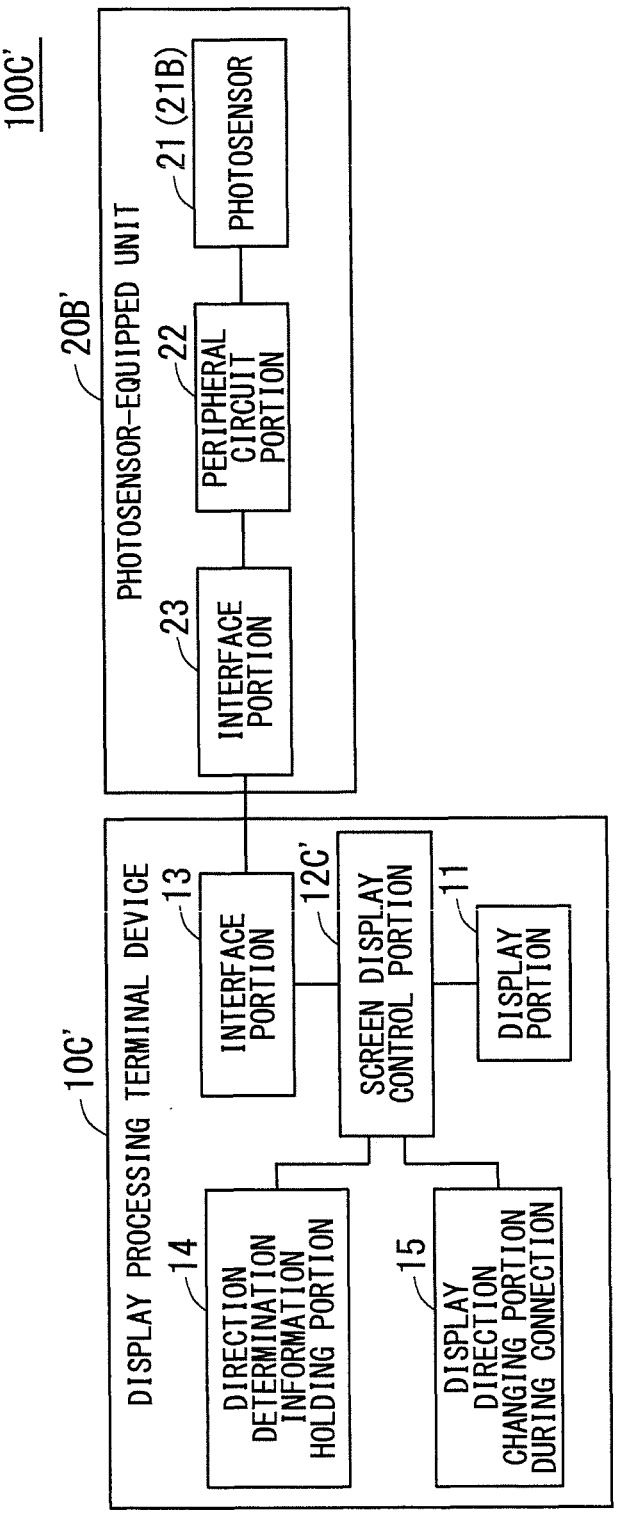

DISPLAY PROCESSING TERMINAL DEVICE, PHOTOSENSOR-EQUIPPED UNIT, AND PHOTOMETRIC SYSTEM

RELATED APPLICATIONS

This is a U.S. National stage of International application No. PCT/JP2013/053954 filed on Feb. 19, 2013.

This patent application claims the priority of Japanese application no. 2012-070575 filed Mar. 27, 2012 the disclosure content of which is hereby incorporated by reference.

TECHNICAL FIELD

The present invention relates to a photometric apparatus such as an illumination photometry sensor or a color measuring sensor, and more particularly to a technique of presenting to a user a desirable viewing direction or a holding direction in a display direction of a screen that displays photometric data.

BACKGROUND ART

As an apparatus (method) of changing a display direction on a screen of an electronic device, a technique of changing a display direction on a screen when an angle indicated by an angle meter satisfies a predetermined condition has been widely used. For example, a technique described in Patent Document 1 provides a portable electronic device that can instantaneously change a screen direction according to an intention of a user.

A photosensor-equipped unit including a light environment measuring sensor that measures illumination, correlated color temperature, and color rendering properties by receiving light including light from an illumination device or sunlight, or a color measuring sensor that measures a color of a sample to be measured by illuminating the sample and receiving light from the sample at a predetermined angle has widely been used as a photometric apparatus having a display function by being connected to a portable electronic device (display processing terminal device) via a general-purpose interface.

PRIOR ART DOCUMENT

Patent Document

Patent Document 1: Japanese Patent Application Laid-Open No. 2008-139711

SUMMARY OF INVENTION

Problems to be Solved by the Invention

However, in the technique described in the Patent Document 1, the display direction on the screen of the display device is determined by a tilt angle relative to a gravitational direction of the display device. Therefore, even when an external connection device is attached to the display device, the display device has a characteristic such that the display direction of the screen is changed depending upon a usage pattern (tilt angle at which the display device is held) of the display device, regardless of the property of the external connection device.

Therefore, when the technique in the Patent Document 1 is applied to a display processing terminal device for a photosensor-equipped unit, there arises a problem such that a display direction of a screen might be a viewing direction undesirable for a user of the photosensor-equipped unit, since the technique in the Patent Document 1 has the characteristic described above.

The present invention is accomplished in view of the above circumstances, and aims to provide a display processing terminal device, a photosensor-equipped unit, and a photometric system that can present a viewing direction or a holding direction such that a display direction of the screen is suitable for a user who uses the display processing terminal device connected to the photosensor-equipped unit.

Means for Solving the Problems

In order to solve the above problems, a display processing terminal device according to an aspect of the present invention can be connected to a photosensor-equipped unit including a photosensor that receives light and acquires predetermined photometric data relating to the received light, the display processing terminal device including: a display portion that performs a display process with any one of plural display directions being specified as a screen display direction; an interface portion that can make communication with the photosensor-equipped unit when the display processing terminal device is connected to the photosensor-equipped unit; and a screen display control portion that executes a display direction setting process during connection for setting the screen display direction of the display portion based upon transmission information relating to the screen display direction acquired from the photosensor-equipped unit, when the display processing terminal device is connected to the photosensor-equipped unit.

The photosensor-equipped unit according to an aspect of the present invention includes a photosensor that receives light and acquires predetermined photometric data relating to the received light, and can be connected to the display processing terminal device. The display processing terminal device includes: a display portion that performs a display process with any one of plural display directions being specified as a screen display direction, and a screen display control portion that executes a display direction setting process during connection for setting the screen display direction of the display portion, when the display processing terminal device is connected to the photosensor-equipped unit. The photosensor-equipped unit includes a transmission information holding portion that holds transmission information relating to the screen display direction on the display portion as a content suitable for the photosensor, and when connected to the display processing terminal device, the photosensor-equipped unit can transmit the transmission information to the display processing terminal device, whereby the screen display control portion in the display processing terminal device can execute the display direction setting process during connection based upon the transmission information.

A photometric system according to an aspect of the present invention includes a photosensor-equipped unit including a photosensor that receives light and acquires predetermined photometric data relating to the received light, and a display processing terminal device including a display portion that performs a display process with any one of plural display directions being specified as a screen display direction; and an interface portion that can communicate with the photosensor-equipped unit when the display processing terminal device is connected to the photosensor-equipped unit, wherein the photosensor-equipped unit further includes a transmission information holding portion that holds transmission information relating to the screen display direction on the display portion as a content suitable for the photosensor, and when connected to the display processing terminal device, the photosensor-equipped unit can transmit the transmission information to the display processing terminal device. The display processing terminal device further includes a screen display control portion that executes a display direction setting process during connection for setting the screen display direction on the display portion based upon the transmission information.

Effects of the Invention

The screen display control portion in the display processing terminal device according to the aspect of the present invention executes the display direction setting process during connection based upon the transmission information relating to the screen display direction acquired from the photosensor-equipped unit, when the display processing terminal device is connected to the photosensor-equipped unit. With this, the screen display direction of the display portion in the display processing terminal device can automatically be set such that the side where the photosensor-equipped unit is connected becomes a desired direction. Consequently, when the user uses the display processing terminal device connected to the photosensor-equipped unit, the screen display control portion can present a viewing direction or holding direction suitable for the user who has no knowledge about the suitable viewing direction or the holding direction, whereby usability for the user is enhanced. The display processing terminal device does not have to have a system for allowing the user to set the viewing direction or the holding direction, whereby cost can be reduced. In addition, the user does not have to set the viewing direction or the holding direction, whereby the usability is further enhanced.

The photosensor-equipped unit according to the aspect of the present invention can transmit the transmission information to the display processing terminal device, when connected to the display processing terminal device. Therefore, since the display processing terminal device holds the transmission information suitable for the photosensor-equipped unit connected thereto, the display processing terminal device can set the screen display direction of the display portion in the display processing terminal device to the direction suitable for the photosensor.

The display processing terminal device in the photometric system according to the aspect of the present invention recognizes the transmission information transmitted from the photosensor-equipped unit, and executes the display direction setting process during connection based upon the transmission information. Thus, since the display processing terminal device holds the transmission information suitable for the photosensor mounted to the photosensor-equipped unit, the display processing terminal device can automatically set a display direction by which the user can easily view the screen without deteriorating the accuracy in the photometric data of the photosensor. Accordingly, the accuracy of the photometric data and usability for the user are enhanced.

BRIEF DESCRIPTION OF DRAWINGS

FIG. 10 is a view for describing a usage example of the photometric system 100C according to the fourth embodiment.

FIG. 11 is a diagram illustrating an example of a functional configuration according to a modification of the photometric system 100C according to the fourth embodiment.

DESCRIPTION OF EMBODIMENTS

Figure 1:
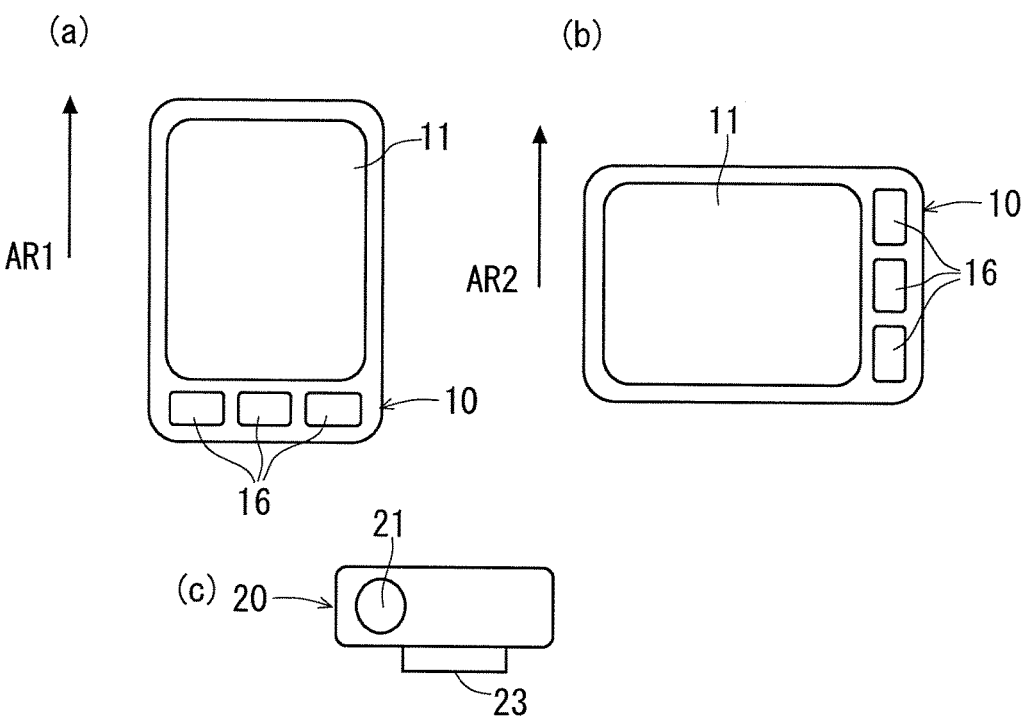
FIG. 1 is a schematic view for describing a display processing terminal device 10 and a photosensor-equipped unit 20 according to a first embodiment.

Embodiments of the present invention will be described below with reference to the drawings. The same numerals are given to the portions having the similar configuration and function in the drawings, and the redundant description will not be repeated in the description below. The drawings are schematically illustrated, and a size and positional relation of each component in the drawings are not correctly illustrated.

The term "photometric system" in the specification of the subject application is used to collectively indicate the whole configuration and the whole function, when a display processing terminal device and a photosensor-equipped unit in each embodiment are combined and connected to each other so as to enable communication.

Arrowed lines AR1 to AR8 described later mean a display direction of a screen in which the direction of an arrow of each arrowed line indicates an upper direction of a display screen on a display portion.

<1. First Embodiment>
<1-1. Appearance and Outline of Usage Pattern of Photometric System>

FIG. 1 is a schematic view for describing a display processing terminal device and a photosensor-equipped unit according to a first embodiment of the present invention, wherein parts (a) and (b) of FIG. 1 are views illustrating an appearance of a display processing terminal device 10, while part (c) of FIG. 1 is a view illustrating an appearance of a photosensor-equipped unit 20.

As illustrated in parts (a) and (b) of FIG. 1, the display processing terminal device 10 includes a display portion 11 that performs a display process with any one of plural display directions (e.g., the arrowed line AR1 illustrated in part (a) of FIG. 1 or the arrowed line AR2 illustrated in part (b) of FIG. 1) being specified as an upper direction of a display screen, and an interface portion 13 (not illustrated in FIG. 1, see later-described FIG. 4) that can communicate with the photosensor-equipped unit 20 when the display processing terminal device 10 is connected to the photosensor-equipped unit 20. Specifically, conceivable examples of the display processing terminal device 10 include an electronic device of a general-purpose terminal complying with an USB standard, such as a smartphone, cellular phone, PDA, game machine, and personal computer. The display processing terminal device 10 includes operation buttons 16 for various operations mounted in the vicinity of the display portion 11.

On the other hand, as illustrated in part (c) of FIG. 1, the photosensor-equipped unit 20 includes an illumination photometry sensor (photosensor) 21 that receives light and acquires predetermined photometric data relating to the received light, and an interface portion 23 that can be connected to the interface portion 13 of the display processing terminal device 10. Specifically, the photosensor-equipped unit 20 is a box-like sensor housing unit in which later-described components (see later-described FIG. 4) are stored, and is configured as an illumination photometry sensor unit having the illumination photometry sensor 21 mounted to the photosensor-equipped unit 20. If the photosensor-equipped unit 20 is formed into a card-like shape (thin shape) in consideration of a thickness of a commonly-used smartphone or cellular phone, the photosensor-equipped unit 20 can provide excellent portability and usability when connected.

Figure 2:
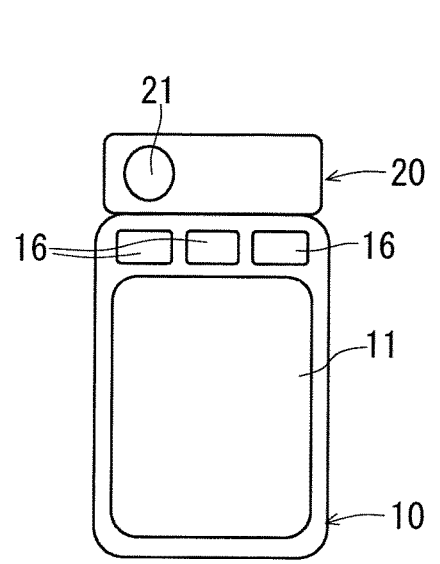
FIG. 2 is a schematic view for describing a photometric system 100 according to the first embodiment.

Next, FIG. 2 is a schematic view for describing a photometric system 100 according to the first embodiment. As illustrated in FIG. 2, the photometric system 100 includes the photosensor-equipped unit 20 (see part (c) of FIG. 1), which has mounted thereto the illumination photometry sensor 21 that receives light and acquires predetermined photometric data relating to the received light, and the display processing terminal device 10 (see parts (a) and (b) of FIG. 1) that includes the display portion 11 performing the display process with any one of the plural display directions being specified as the upper direction of the display screen and the interface portion 13 that can communicate with the photosensor-equipped unit 20 when the display processing terminal device 10 is connected to the photosensor-equipped unit 20. The photometric system 100 is configured by combining the photosensor-equipped unit 20 and the display processing terminal device 10 in such a manner that the display processing terminal device 10 and the photosensor-equipped unit 20 are connected to each other so as to enable communication. Specifically, the photometric system 100 functions as a carriageable portable illumination meter.

<1-2. General Property and Presupposition Circumstance of Display Processing Terminal Device>

As a presupposition for describing the detail of the photometric system 100 according to the first embodiment of the present invention, a general property of a conventional display processing terminal device and circumstances caused by the general property, i.e., circumstances caused in the background art, will be described.

Figure 3:
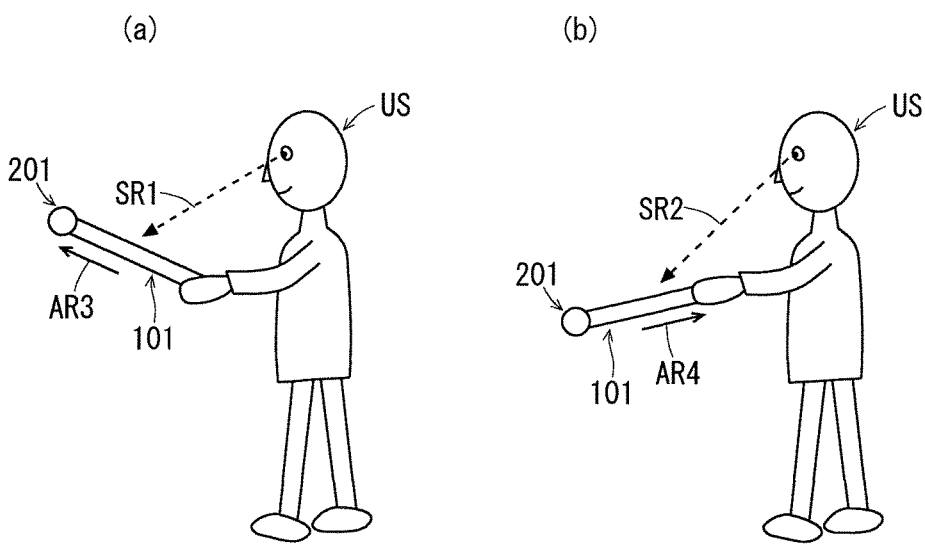
FIG. 3 is an explanatory view illustrating a problem of a conventional photometric system.

It has been known that an illumination meter can be inexpensively provided by mounting an illumination photometry sensor to a general-purpose display processing terminal device. FIG. 3 is a view for describing a photometric device formed by combining a photosensor-equipped unit 201 having a photosensor portion to a conventional display processing terminal device 101. Proper measurement cannot be made, when the photosensor portion is hidden behind a user US upon illumination photometry.

Therefore, a preferable usage pattern is such that the user US holds the display processing terminal device 101 with the photosensor portion being located on the farthest side from the user US out of the sides of the display portion as illustrated in parts (a) and (b) of FIG. 3.

Part (a) of FIG. 3 illustrates the case in which the user US holds the display processing terminal device 101 at a tilt angle such that the photosensor-equipped unit 201 is located at an upper side of the display processing terminal device 101. In this case, a display direction (arrowed line AR3) is set such that the direction opposite to the gravitational direction is the upper direction of the display screen, and the gravitational direction is the lower direction of the display screen. This is because, in the conventional display processing terminal device 101, the display direction of the screen is determined based upon the tilt angle of the body of the display processing terminal device 101, i.e., the attitude of the display processing terminal device 101. Therefore, the setting of the display direction of the arrowed line AR3 indicates that the display direction is set in a general direction in which the user US can easily view the screen, with respect to a viewing direction SR1 of the user US.

On the other hand, when the user US holds the display processing terminal device 101 at a tilt angle such that the photosensor-equipped unit 201 is located at the lower side of the display processing terminal device 101 as illustrated in part (b) of FIG. 3, the display direction (arrowed line AR4) is set such that the direction opposite to the gravitational direction is the upper direction of the display screen, and the gravitational direction is the lower direction of the screen. This indicates that the display direction of the arrowed line AR4 is generally the direction having poor visibility with respect to a viewing direction SR2 of the user US.

When the conventional display processing terminal device 101 is used with the photosensor-equipped unit 201 being mounted thereto, the screen display direction has to be appropriately changed according to the type and usage of the photosensor-equipped unit 201.

Under such background, a display processing terminal device, a photosensor-equipped unit, and a photometric system according to the present invention of the subject application are configured to present a viewing direction or holding direction by which the screen display direction is suitable for the user US who uses the display processing terminal device connected to the photosensor-equipped unit.

Under the presupposition described above, a basic configuration and usage example of the first embodiment will be described below.

<1-3. Basic Functional Configuration of Photometric System 100>

Figure 4:
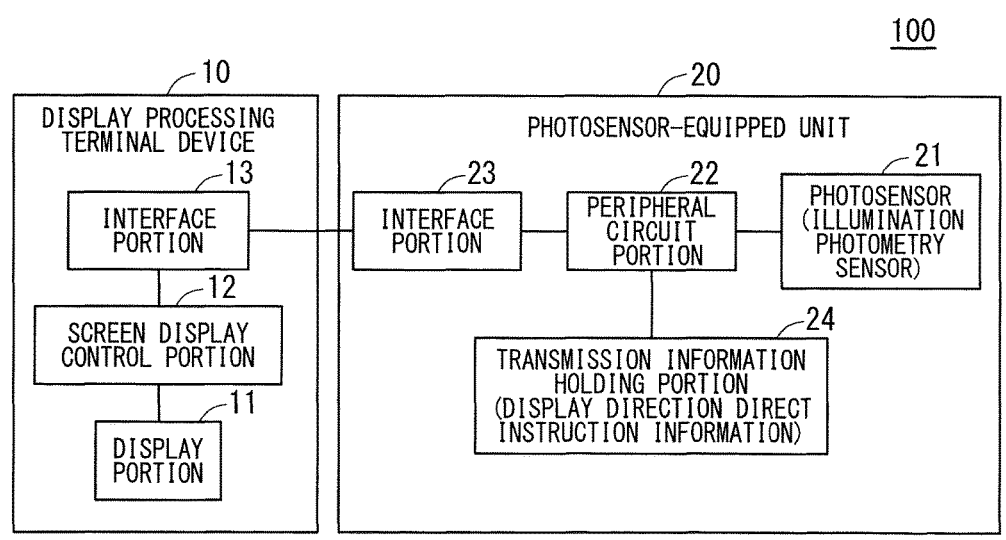
FIG. 4 is a diagram illustrating an example of a basic functional configuration of the photometric system 100 according to the first embodiment.

FIG. 4 is a diagram illustrating an example of a basic functional configuration of the photometric system 100 according to the first embodiment of the present invention. The photometric system 100 has a configuration formed by combining the display processing terminal device 10 and the photosensor-equipped unit 20 as described later.

<1-3-1. Functional Configuration of Display Processing Terminal Device 10>

As illustrated in FIG. 4, the display processing terminal device 10 in the photometric system 100 includes the display portion 11 and the interface portion 13. The display processing terminal device 10 also acquires transmission information relating to a screen display direction, i.e., information (the detail will be described later) referred to by the display processing terminal device 10 as screen display direction information, which is acquired from the photosensor-equipped unit 20 via the interface portion 13, from the photosensor-equipped unit 20, when the display processing terminal device 10 is connected to the photosensor-equipped unit 20. The transmission information may be acquired such that the display processing terminal device 10 transmits an inquiry signal and the photosensor-equipped unit 20 gives a response to this inquiry signal. Alternatively, the transmission information may be acquired such that the photosensor-equipped unit 20 transmits a signal relating to the transmission information to the display processing terminal device 10.

The display processing terminal device 10 also includes a screen display control portion 12 that executes a display direction setting process during connection for setting a screen display direction of the display portion 11 based upon the transmission information. The display portion 11 is made of a liquid crystal display, and displays a result of measurement data sent from the photosensor-equipped unit 20. Alternatively, the display portion 11 may analyze data with application software in the display processing terminal device 10, and display the content according to the analyzed result.

As described above, when the display processing terminal device 10 is connected to the photosensor-equipped unit 20, the screen display control portion 12 of the display processing terminal device 10 executes the display direction setting process during connection based upon the transmission information relating to the screen display direction acquired from the photosensor-equipped unit 20. Thus, the screen display direction of the display portion 11 in the display processing terminal device 10 can automatically be set such that the side where the photosensor-equipped unit 20 is connected becomes a desired direction. Consequently, when the user US uses the display processing terminal device 10 connected to the photosensor-equipped unit 20, the screen display control portion 12 can present the viewing direction or holding direction suitable for the user US who has no knowledge about the suitable viewing direction or the holding direction, whereby the usability for the user US is enhanced. The display processing terminal device 10 does not have to have a system for allowing the user US to set the viewing direction or the holding direction, whereby cost can be reduced. In addition, the user US does not have to set the viewing direction or the holding direction, whereby the usability is further enhanced.

<1-3-2. Functional Configuration of Photosensor-Equipped Unit 20>

The photosensor-equipped unit 20 includes the illumination photometry sensor 21 and the interface portion 23, and further includes a transmission information holding portion 24 that holds the transmission information relating to the screen display direction of the display portion 11 as a content suitable for the illumination photometry sensor 21. When the photosensor-equipped unit 20 is connected to the display processing terminal device 10, the transmission information holding portion 24 can transmit the transmission information relating to the screen display direction of the display portion 11 in the display processing terminal device 10 to the display processing terminal device 10, and the screen display control portion 12 in the display processing terminal device 10 executes the display direction setting process during connection based upon the transmission information.

The photosensor-equipped unit 20 also includes a peripheral circuit portion 22 that is a circuit portion for allowing the interface portion 23, the illumination photometry sensor 21, and the transmission information holding portion 24 to operate in association with one another. The illumination photometry sensor 21 includes a photosensor, which can measure a target illumination, as a functional component. When the interface portion 23 is connected to the interface portion 13 in the display processing terminal device 10, a signal can be received and sent between the photosensor-equipped unit 20 and the display processing terminal device 10.

Since the photosensor according to the first embodiment is the illumination photometry sensor 21 as described above, the transmission information held by the transmission information holding portion 24 is set as display direction direct instruction information indicating that the side of the photosensor-equipped unit 20 becomes the upper direction (direction of the arrowed line AR5 in FIG. 5 described later) of the display screen of the display portion 11 (display processing terminal device 10).

As described above, the photosensor-equipped unit 20 can transmit the transmission information (display direction direct instruction information) to the display processing terminal device 10, when connected to the display processing terminal device 10. Therefore, the photosensor-equipped unit 20 can set the screen display direction of the display portion 11 in the display processing terminal device 10 to the direction suitable for the illumination photometry sensor 21 by holding the transmission information suitable for the illumination photometry sensor 21 mounted to the photosensor-equipped unit 20.

When the photosensor is the illumination photometry sensor 21, the photosensor-equipped unit 20 holds the display direction direct instruction information, instructing that the side of the photosensor-equipped unit 20 becomes the upper direction of the display screen of the display portion 11 in the display processing terminal device 10, as the transmission information. Therefore, different from the conventional display processing terminal device 101 illustrated in FIG. 3, the photosensor-equipped unit 20 that is used as being connected to the display processing terminal device 10 can allow the user US to hold the side of the display portion 11 where the illumination photometry sensor 21 is not mounted in order to prevent the illumination photometry sensor 21 from being hidden behind the user US upon the measurement. As a result, photometric data can accurately be obtained by the illumination photometry sensor 21.

In addition, the side where the photosensor-equipped unit 20 is mounted with the illumination photometry sensor 21 always becomes the upper direction of the display screen from the user US, even if the attitude of the display processing terminal device 10 connected to the photosensor-equipped unit 20 is changed. Therefore, the visibility is not deteriorated.

<1-4. Specific Usage Example>

Figure 5:
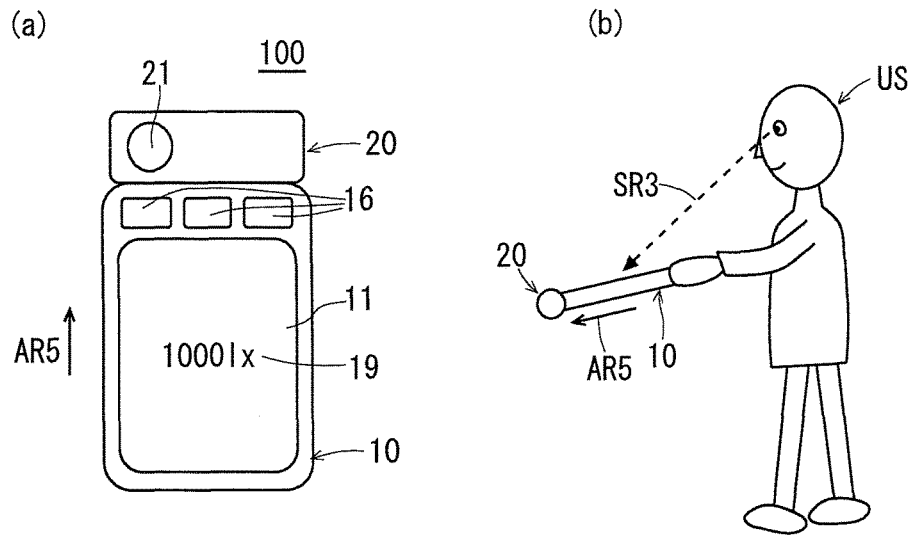
FIG. 5 is a view for describing a configuration of the photometric system 100 and a usage example thereof according to the first embodiment.

FIG. 5 is a view for describing the photometric system 100 according to the first embodiment. Part (a) of FIG. 5 is an overall configuration of the photometric system 100, and part (b) of FIG. 5 is a view illustrating its usage example.

As illustrated in part (a) of FIG. 5, the illumination photometry sensor 21 is mounted to the photosensor-equipped unit 20 in the photometric system 100, and the illumination photometry sensor 21 is arranged at the side most apart from the user US. In this case, the side where the photosensor-equipped unit 20 is mounted desirably becomes the upper direction of the display screen, so that information directly instructing the display direction (arrowed line AR5) is set as the transmission information (display direction direct instruction information). As illustrated in part (b) of FIG. 5, even when the user US makes measurement by holding the display processing terminal device 10 with a tilt angle by which the side of the photosensor-equipped unit 20 is located in the lower direction of the display processing terminal device 10 as in part (b) of FIG. 3, the screen display direction is automatically set to the direction based on the transmission information (display direction direct instruction information), whereby the display direction is set to the direction that the user US can easily view the screen relative to a viewing direction SR3 of the user US. Accordingly, the user US can easily recognize numerals or characters 19 (see part (a) of FIG. 5) relating to the measurement data displayed in the direction of the arrowed line AR5 on the display portion 11.

As described above, the screen display direction is always automatically set, as a default, to the direction (arrowed line AR5) in which the side where the photosensor-equipped unit 20 is mounted becomes the upper direction of the display screen of the display portion 11, without depending upon the tilt angle (attitude) of the body of the display processing terminal device 10 (see FIG. 5).

As described above, the display processing terminal device 10 in the photometric system 100 according to the first embodiment recognizes the transmission information (display direction direct instruction information) transmitted from the photosensor-equipped unit 20, and executes the display direction setting process during connection based upon the transmission information. Thus, the display processing terminal device 10 holds the transmission information suitable for the illumination photometry sensor 21 mounted to the photosensor-equipped unit 20, whereby it can automatically set the screen display direction by which the user US can easily view the screen without deteriorating the accuracy of the photometric data of the illumination photometry sensor 21. Accordingly, the accuracy of the photometric data and usability for the user US are enhanced.

Since the illumination photometry sensor 21 is mounted to the photosensor-equipped unit 20, the display direction direct instruction information instructing that the side where the photosensor-equipped unit 20 is mounted becomes the upper direction of the display screen of the display portion 11 can be acquired as the transmission information. Therefore, the display processing terminal device 10 can lead the user US to hold the side of the display portion 11 where the illumination photometry sensor 21 is not mounted, in order to prevent the illumination photometry sensor 21 from being hidden behind the user US during the measurement. Consequently, the illumination photometry sensor 21 can acquire photometric data with high accuracy.

Even if the attitude of the photometric system 100 is changed, the side where the photosensor-equipped unit 20 is mounted always becomes the upper direction in the display screen, as viewed from the user US, whereby visibility is not deteriorated (see FIG. 5).

In the first embodiment, after executing the display direction setting process during connection, the screen display control portion 12 desirably controls to fix the screen display direction of the display portion 11 to the direction set in the display direction setting process during connection, if the connection between the display processing terminal device 10 and the photosensor-equipped unit 20 is maintained.

<2. Second Embodiment>
<2-1. Basic Functional Configuration of Photometric System 100A>

Figure 6:
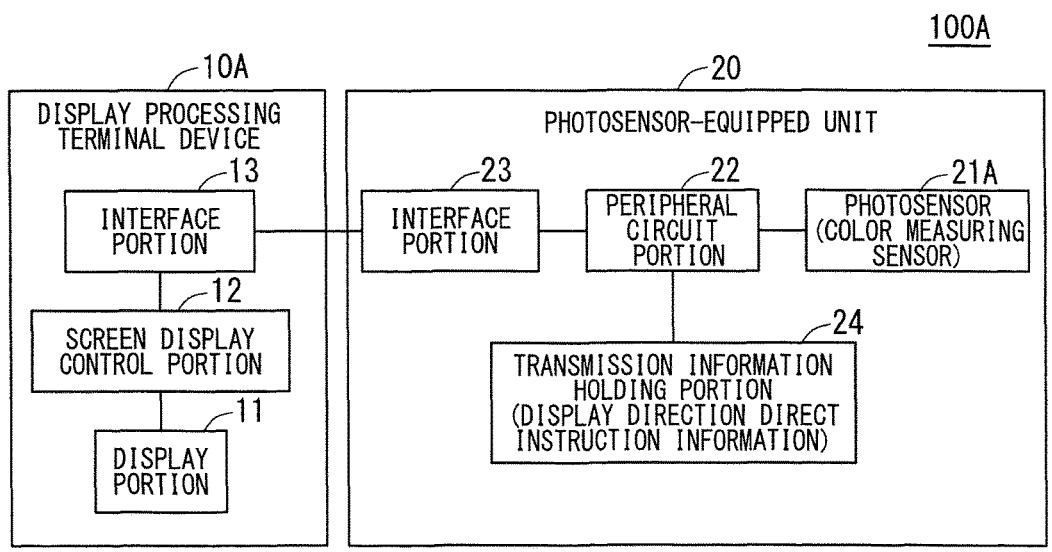
FIG. 6 is a diagram illustrating an example of a basic functional configuration of a photometric system 100A according to a second embodiment.

FIG. 6 is a diagram illustrating an example of a basic functional configuration of a photometric system 100A according to a second embodiment. The basic functional configuration of the photometric system 100A according to the second embodiment will be described with reference to FIG. 6. The schematic configuration and function of the photometric system 100A according to the second embodiment are different from those of the first embodiment in that a photosensor in the second embodiment is provided as a color measuring sensor 21A, while the photosensor in the first embodiment is provided as the illumination photometry sensor 21. Therefore, a photosensor-equipped unit 20A and a display processing terminal device 10A are changed to be adapted to the color measuring sensor 21A. In other words, the color measuring sensor 21A is provided in place of the illumination photometry sensor 21, and the content of the transmission information held in the transmission information holding portion 24 is changed. The other configuration and function are the same as those of the photometric system 100 in the first embodiment.

Since the photosensor-equipped unit 20A is configured as a color measuring sensor including a color measuring sensor 21A, a general principle and usage pattern of a color measuring sensor will schematically be described. The color measuring sensor includes an illumination system and a light-receiving system. The illumination system illuminates a surface to be measured of a subject to be measured at a predetermined angle, and the light-receiving system receives reflection light reflected from the surface to be measured by the light from the illumination system at a predetermined angle, whereby a color of the surface to be measured is measured. For this process, it is supposed that the user US is likely to use the color measuring sensor facing downward (e.g., see later-described part (b) of FIG. 7).

Since the photosensor is the color measuring sensor 21A, the photosensor-equipped unit 20A sets the transmission information as display direction direct instruction information instructing that the side where the photosensor-equipped unit 20A is mounted becomes the lower direction (the direction of the arrowed line AR6 in later-described FIG. 7) of the display screen of the display portion 11 (display processing terminal device 10A).

The screen display control portion 12 in the display processing terminal device 10A executes the display direction setting process during connection for setting the screen display direction of the display portion 11 based upon the transmission information (display direction direct instruction information) acquired from the photosensor-equipped unit 20A, when the display processing terminal device 10 is connected to the photosensor-equipped unit 20A.

Since the photosensor includes the color measuring sensor 21A as described above, the photosensor-equipped unit 20A holds the display direction direct instruction information, which instructs that the side where the photosensor-equipped unit 20A is mounted becomes the lower direction of the display screen of the display portion 11 in the display processing terminal device 10A, in the transmission information holding portion 24 as the transmission information. Accordingly, when the photosensor-equipped unit 20A is used as being connected to the display processing terminal device 10A, the display portion 11 in the display processing terminal device 10A displays such that the side where the color measuring sensor 21A, which is frequently used to face downward, becomes the lower direction of the display screen. With this, the user can view the screen without having deterioration in the visibility even if the attitude of the display processing terminal device 10A is changed.

As a result, the screen display direction of the display portion 11 in the display processing terminal device 10A can automatically be set to the direction in which the side where the photosensor-equipped unit 20A including the color measuring sensor is mounted becomes the desired direction.

<2-2. Specific Usage Example>

Figure 7:
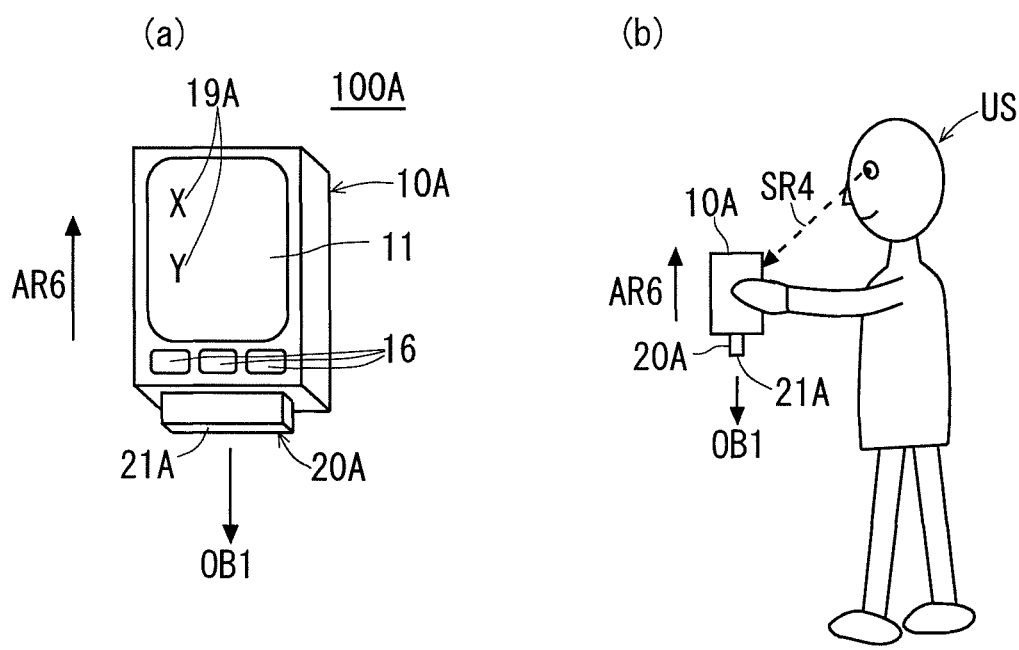
FIG. 7 is a view for describing a configuration of the photometric system 100A and a usage example thereof according to the second embodiment.

FIG. 7 is a view for describing a photometric system 100A according to the second embodiment, wherein part (a) of FIG. 7 is a view illustrating an overall configuration of the photometric system 100A, and part (b) of FIG. 7 is a view illustrating a usage example thereof.

The photosensor is the color measuring sensor 21A in the photometric system 100A. Therefore, as described above, the screen display direction by which visibility is assured when the user US uses the color measuring sensor 21A facing downward (arrowed line OB1) is the display direction of the arrowed line AR6 in which the side where the photosensor-equipped unit 20A is mounted becomes the lower direction of the display screen of the display portion 11 as illustrated in part (a) of FIG. 7, and the transmission information is set as the display direction direct instruction information directly instructing this display direction (arrowed line AR6). When the user US makes the measurement with the side where the photosensor-equipped unit 20A is mounted being located at the lower side of the display processing terminal device 10A (arrowed line OB1) as illustrated in part (b) of FIG. 7 the display direction is automatically set to the display direction based upon the transmission information. Therefore, the display direction is set to the direction by which the user US can easily view the screen with respect to a viewing direction SR4 of the user US. Accordingly, the user US can easily recognize numerals or characters 19A displayed on the display portion 11 in the display direction of the arrowed line AR6.

When the measurement direction of the photosensor-equipped unit 20A is the direction of the arrowed line OB1, the screen display direction of the display portion 11 is automatically set, as a default, to the direction of the arrowed line AR6 opposite to the measurement direction of the arrowed line OB1 (see FIG. 7).

As described above, in the photometric system 100A according to the second embodiment, the display direction direct instruction information instructing that the side where the photosensor-equipped unit 20A is mounted becomes the lower direction of the display screen of the display portion 11 is obtained as the transmission information, since the photosensor is the color measuring sensor 21A. Therefore, the display portion 11 executes the display process such that the side where the color measuring sensor 21A that is likely to be used to face downward is mounted becomes the lower direction of the display screen, whereby the user can view the screen without having deterioration in visibility even when the attitude is changed.

As a result, the screen display direction of the display portion 11 in the display processing terminal device 10A can automatically be set to the direction (direction of the arrowed line AR6 in FIG. 7) suitable for the case where the photosensor-equipped unit 20A having the color measuring sensor is used.

In the second embodiment, similar to the first embodiment, after executing the display direction setting process during connection, the screen display control portion 12 may employ a structure to fix the screen display direction of the display portion 11 to the direction set in the display direction setting process during connection, if the connection between the display processing terminal device 10A and the photosensor-equipped unit 20A is maintained.

<3. Third Embodiment>

Figure 8:
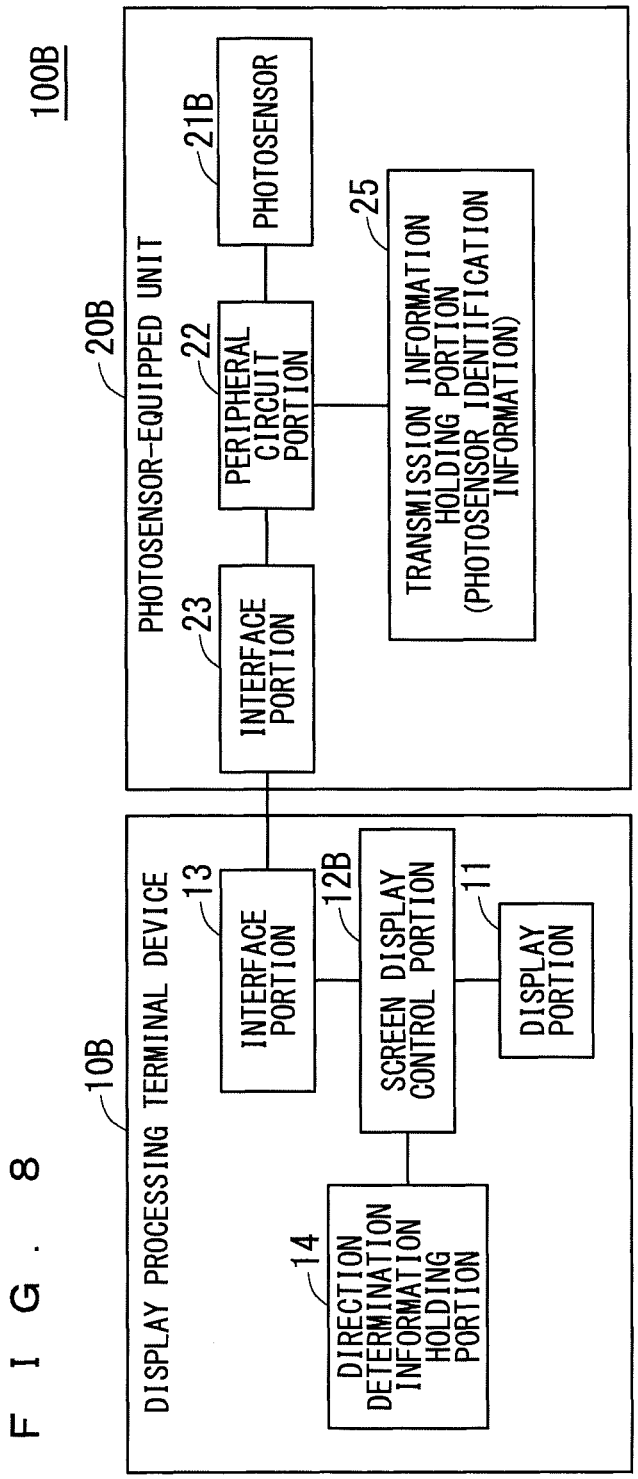
FIG. 8 is a diagram illustrating an example of a basic functional configuration of a photometric system 100E according to a third embodiment.

FIG. 8 is a diagram illustrating an example of a basic functional configuration of a photometric system 100B according to a third embodiment of the present invention. The different point in the functional configuration between the photometric system 100B according to the third embodiment and the first embodiment is that a direction determination information holding portion 14 (see FIG. 8) is also provided to a display processing terminal device 10B. The photosensor-equipped unit 20B includes a transmission information holding portion 25 that holds photosensor identification information, which can identify a type of a photosensor 21B, instead of the transmission information holding portion 24. The photosensor 21B may be the illumination photometry sensor 21 as in the first embodiment or the color measuring sensor 21A as in the second embodiment. The other configuration and function are the same as those of the photometric system 100 in the first embodiment.

The transmission information held in the transmission information holding portion 25 includes the photosensor identification information for identifying the type (illumination photometry sensor or color measuring sensor) of the photosensor in the photosensor 21B, and is transmitted to a screen display control portion 12B via the interface portions 23 and 13 during the connection.

The transmission information may be delivered such that a signal relating to the transmission information is transmitted to the display processing terminal device 10B from the photosensor-equipped unit 20B, or the photosensor-equipped unit 20 transmits a response to an inquiry signal transmitted from the display processing terminal device 10B and the screen display control portion 12B acquires this response.

The screen display control portion 12B determines the content of the instruction of the display direction determination information based upon the transmission information (photosensor identification information), and executes the display direction setting process during connection. The direction determination information holding portion 14 holds the display direction determination information determined as described above.

The photosensor identification information may be any information, so long as it can identify the type of the sensor of the photosensor 21B. For example, a numeral or character may be used as the photosensor identification information.

In the photometric system 100B, the photosensor-equipped unit 20B can be configured as the photosensor-equipped unit 20 including the illumination photometry sensor 21 in the first embodiment, as well as configured as the photosensor-equipped unit 20A including the color measuring sensor 21A in the second embodiment (see FIG. 8).

This point will be described in detail. When the photosensor-equipped unit 20B includes the illumination photometry sensor as the photosensor 21B, the photosensor identification information, indicating that the photosensor is the illumination photometry sensor, is held in the transmission information holding portion 25 as the transmission information. Therefore, the screen display control portion 12B executes the display direction setting process during connection for determining the display direction determination information, which instructs that the side where the photosensor-equipped unit 20B is mounted becomes the upper direction of the display screen of the display portion 11, based upon the transmission information (photosensor identification information), and holds the display direction determination information in the direction determination information holding portion 14. Thus, the display control similar to the display control in the first embodiment can be executed.

On the other hand, when the photosensor-equipped unit 20B includes the color measuring sensor as the photosensor 21B, the photosensor identification information, indicating that the photosensor is the color measuring sensor, is held in the transmission information holding portion 25 as the transmission information. Therefore, the screen display control portion 12B executes the display direction setting process during connection for determining the display direction determination information, which instructs that the side where the photosensor-equipped unit 20B is mounted becomes the lower direction of the display screen of the display portion 11, based upon the transmission information (photosensor identification information), and holds the display direction determination information in the direction determination information holding portion 14. Thus, the display control similar to the display control in the second embodiment can be executed.

As described above, in the photometric system 100B according to the third embodiment, the screen display control portion 12B in the display processing terminal device 10B determines the display direction determination information for determining the screen display direction of the display portion 11 upon the connection to the photosensor-equipped unit 20B based upon the transmission information (photosensor identification information) held in the transmission information holding portion 25, and executes the display direction setting process during connection. Thus, the display direction by which the user US can easily view the screen can automatically be set, in consideration of the type of the photosensor, i.e., the illumination photometry sensor or the color measuring sensor, in the photosensor 21B in the photosensor-equipped unit 20B, without causing deterioration in accuracy of the photometric data of the photosensor 21B. Accordingly, the accuracy of the photometric data and usability for the user US are enhanced.

The photosensor-equipped unit 20B may hold only the photosensor identification information as the transmission information, or may hold the photosensor identification information and the display direction direct instruction information as described in the embodiments 1 and 2.

As in the first embodiment, after executing the display direction setting process during connection, the screen display control portion 12B may employ a structure to fix the screen display direction of the display portion 11 to the direction (instructed by the display direction determination information) set in the display direction setting process during connection, if the connection between the display processing terminal device 10B and the photosensor-equipped unit 20B is maintained, in the third embodiment.

<Fourth Embodiment>

Figure 9:
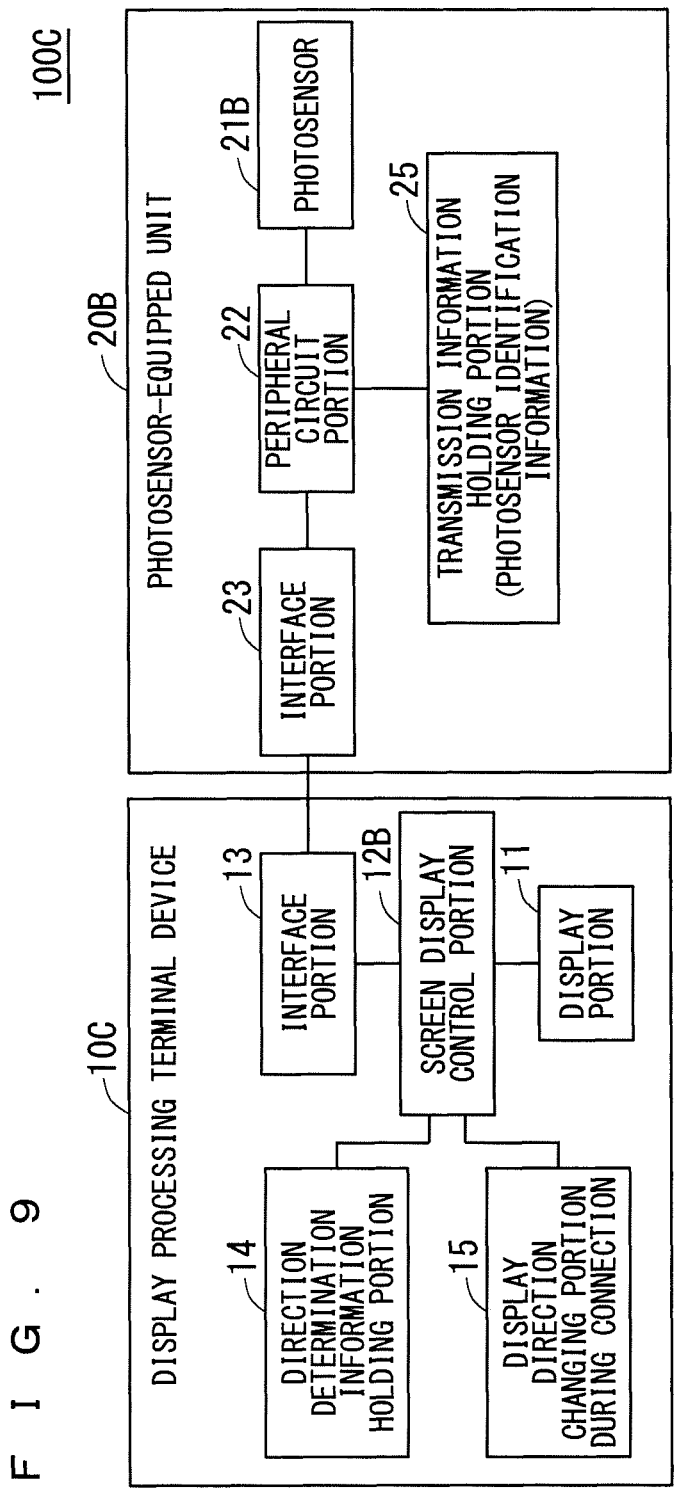
FIG. 9 is a diagram illustrating an example of a basic functional configuration of a photometric system 100C according to a fourth embodiment.

FIG. 9 is a diagram illustrating an example of a basic functional configuration of a photometric system 100C according to a fourth embodiment. The different point in the functional configuration between the photometric system 100C according to the fourth embodiment and the third embodiment is that a display direction changing portion during connection 15 (see FIG. 9) is also provided to the display processing terminal device 10B. The other configuration and function are the same as those of the photometric system 100B in the third embodiment.

The display direction changing portion during connection 15 can change the screen display direction after the above-mentioned display direction setting process during connection to the other display direction, during the connection to the photosensor-equipped unit 20B.

In the display processing terminal device 10C in the photometric system 100C, the display direction changing portion during connection 15 is provided to the display processing terminal device 10B including the direction determination information holding portion 14 according to the third embodiment. However, the display direction changing portion during connection 15 can also be provided to the display processing terminal device 10 (10A), which does not include the direction determination information holding portion 14, according to the first (second) embodiment.

<4-1. Specific Usage Example>

FIG. 10 is a view for describing the photometric system 100C according to the fourth embodiment. Part (a) of FIG. 10 is a view illustrating an overall configuration of the photometric system 100C, and part (b) of FIG. 10 is a view illustrating a usage example thereof. It is described that the photometric system 100C in FIG. 10 includes the photosensor-equipped unit 20B to which a color measuring sensor is mounted as the photosensor 21B.

As illustrated in part (a) of FIG. 10, when the measuring direction of the photosensor-equipped unit 20B is a direction of an arrowed line OB2, the direction of the arrowed line AR7 opposite to the measuring direction of the arrowed line OB2 is set to be a default as the screen display direction of the display portion 11 in the display processing terminal device 10C (see the second embodiment and FIG. 7). However, as illustrated in part (b) of FIG. 10, when the display direction is the direction of the arrowed line AR7, visibility is deteriorated with respect to a viewing direction SR5 of the user US. In view of this, the user US can change the screen display direction to the arrowed line AR8 by giving an instruction to the display direction changing portion during connection 15 via the operation unit 16 of the display processing terminal device 10C. Thus, the user US can easily recognize numerals or characters 19C displayed on the display screen of the display portion 11 in the display direction of the arrowed line AR8.

As described above, when it is desirable that the user US holds the display processing terminal device 10C with the photosensor-equipped unit 20B apart from the user US oneself, and makes measurement by pressing the photosensor-equipped unit 20B to a subject to be measured, i.e., when the user US measures a wall face, the function of the display direction changing portion during connection 15 in the photometric system 100C is effective.

As described above, in the photometric system 100C according to the fourth embodiment, the display processing terminal device 10C further includes the display direction changing portion during connection 15 that can change the screen display direction (arrowed line AR7 in FIG. 10) after the display direction setting process during connection to the other display direction (arrowed line AR8 in FIG. 10), when the display processing terminal device 10C is connected to the photosensor-equipped unit 20B. With this configuration, the screen display direction can be changed depending upon the usage pattern, even after the display direction setting process during connection, whereby the display direction desired by the user US (arrowed line AR8 in FIG. 10) can be realized. Thus, the usability for the user US is more enhanced.

<4-2. Modification of Photometric System 100C>

FIG. 11 is a diagram illustrating a functional configuration of a modification of the photometric system 100C according to the fourth embodiment. As illustrated in FIG. 11, the different point in the functional configuration between a photometric system 100C' and the fourth embodiment is that a photosensor-equipped unit 20B' does not include the transmission information holding portion 25, and a screen display control portion 12C' in a display processing terminal device 10C' is changed so as to be adapted to the above configuration.

Specifically, transmission information is not transmitted to the display processing terminal device 10C' from the photosensor-equipped unit 20B', since the transmission information holding portion 25 is not present. In the photometric system 100C', the screen display control portion 12C' determines and decides the screen display direction of the display portion 11 by setting the display direction determination information instructing a predetermined display direction during the connection to the photosensor-equipped unit 20B'. Specifically, the screen display control portion 12C' determines and holds the instruction content of the display direction determination information without depending upon the connected photosensor-equipped unit 20B', thereby executing the display direction setting process during connection.

As described above, in the photometric system 100C', the display processing terminal device 10C' determines and sets the display direction, even if the transmission information according to the type of the photosensor of the photosensor 21B mounted to the photosensor-equipped unit 20B' is not transmitted to the display processing terminal device 10C'.

When the determined screen display direction is different from the display direction desired by the user US, the user gives an instruction to the display direction changing portion during connection 15 by using the operation unit 16. Thus, the user US can change the display direction to the desired display direction.

The photosensor 21B mounted to the photosensor-equipped unit 20B' in the photometric system 100C' may be either one of an illumination photometry sensor and a color measuring sensor (see FIG. 11).

<5. Modification>

While the embodiments of the present invention have been described above, the present invention is not limited to these embodiments, and various modifications are possible.

In the embodiments of the present invention, the photometric systems 100, 100A to 100C, and 100C' are separately described in each embodiment such that these photometric systems are individually embodied. However, these individual functions may be combined to one another, so long as they are consistent with one another.

The photosensor-equipped unit according to the embodiments of the present invention has a function of measuring a target light intensity, and can be used in combination with a function (display device, speaker, printer, external transmission function (connection to phone, LAN, and the Internet)) of a general-purpose terminal.

The invention claimed is:

1. A display processing terminal device connectable to and detachable from one of many types of a photosensor-equipped unit that includes a photosensor receiving light and acquiring predetermined photometric data relating to the received light, the display processing terminal device comprising:
a display portion that performs a display process with any one of plural display directions being specified as a screen display direction and displays data received by the display portion and sent from the connected photosensor-equipped unit, a side of the display portion being configured for removable attachment of the photosensor-equipped unit;
an interface portion configured to communicate with said photosensor-equipped unit when the display processing terminal device is connected to said photosensor-equipped unit; and
a screen display control portion that executes a display direction setting process when the display processing terminal device is connected to the photosensor-equipped unit, the display direction setting process setting said screen display direction of said display portion based upon transmission information relating to said screen display direction acquired from said connected photosensor-equipped unit, the transmission information identifying an optimal display direction for viewing of the display portion by a user, the transmission information identifying the type of the photosensor-equipped unit that has been connected to the display processing terminal device, the optimal display direction being selected without action by a user and based upon the type of the photosensor-equipped unit connected to the display processing terminal device,
wherein the screen display control portion sets the display portion by default so that the side where said photosensor-equipped unit has been connected becomes an upper direction or a lower direction when the display processing terminal is connected to said photosensor-equipped unit, and
wherein in accordance with the type of said photosensor-equipped unit to which the display processing terminal device has been connected, the screen display control portion sets by default whether a side of connecting said photosensor-equipped unit becomes an upper side or a lower side in said screen display direction.

2. The display processing terminal device according to claim 1, further comprising a direction determination information holding portion that holds display direction determination information for determining a screen display direction of said display portion when the display processing terminal device is connected to said photosensor-equipped unit,
wherein said transmission information includes photosensor identification information identifying a type of said photosensor, and
wherein said screen display control portion determines an instruction content of said display direction determination information based upon said photosensor identification information, and executes said display direction setting process during connection.

3. The display processing terminal device according to claim 1, further comprising a display direction changing portion configured to change said screen display direction, after said display direction setting process, to another display direction, when the display processing terminal device is connected to said photosensor-equipped unit.

4. A photosensor-equipped unit that includes a photosensor that receives light and acquires predetermined photometric data relating to the received light, the photosensor-equipped unit being connectable to and detachable from a side of a display processing terminal device, the display processing terminal device including a display portion that performs a display process with any one of plural display directions being specified as a screen display direction and displays a result of data received by the display portion and sent from the photosensor-equipped unit, and a screen display control portion that executes a display direction setting process when the display processing terminal device is connected to the photosensor-equipped unit, the display direction setting process setting said screen display direction of said display portion, the photosensor-equipped unit comprising a transmission information holding portion that holds transmission information relating to said screen display direction of said display portion with a content suitable for said photosensor,
  wherein the transmission information holding portion is configured to transmit said transmission information to said display processing terminal device when the photosensor-equipped unit is connected to said display processing terminal device, and said screen display control portion in said display processing terminal device executes said display direction setting process during connection based upon said transmission information from said transmission information holding portion of said photosensor-equipped unit, the transmission information identifying an optimal display direction for viewing of the display portion by a user, the transmission information identifying a type of the photosensor-equipped unit that has been connected to the display processing terminal device, the optimal display direction being selected without action by the user based upon the type of the photosensor-equipped unit connected to the display processing terminal device, and
  wherein in said transmission information, a display screen is set by default so that the side where the photosensor-equipped unit has been connected becomes an upper direction or a lower direction when the photosensor-equipped unit is connected to said display processing terminal device.

5. The photosensor-equipped unit according to claim 4,
wherein said photosensor is an illumination photometry sensor, and
wherein said transmission information includes display direction direct instruction information instructing that the side where said photosensor-equipped unit is mounted becomes an upper direction of a display screen of said display portion.

6. The photosensor-equipped unit according to claim 4,
wherein said photosensor is a color measuring sensor, and
wherein said transmission information includes display direction direct instruction information instructing that the side where said photosensor-equipped unit is mounted becomes a lower direction of a display screen of said display portion.

7. A photometric system comprising:
one of a plurality of types of a photosensor-equipped unit, each including a photosensor that receives light and acquires predetermined photometric data relating to the received light; and
a display processing terminal device that includes a display portion performing a display process with any one of plural display directions being specified as a screen display direction and displays a result of data received by the display processing terminal device and sent from the photosensor-equipped unit, and an interface portion configured to communicate with said photosensor-equipped unit when the display processing terminal device is connected to said photosensor-equipped unit, the photosensor-equipped unit being connectable to and detachable from a side of the display processing terminal device;
wherein the photosensor-equipped unit further includes a transmission information holding portion that holds transmission information relating to said screen display direction of said display portion with a content suitable for said photosensor,
  wherein the transmission information holding portion is configured to transmit said transmission information to said display processing terminal device when said photosensor-equipped unit is connected to said display processing terminal device, the transmission information identifying the type of photosensor-equipped unit that has been connected to the display processing terminal,
  wherein said display processing terminal device further includes a screen display control portion that executes a display direction setting process when the display processing terminal device is connected to the photosensor-equipped unit, the display direction setting process setting said screen display direction of said display portion based upon said transmission information from said transmission information holding portion of said photosensor-equipped unit, the transmission information identifying an optimal display direction for viewing of the display portion by a user, the optimal display direction being selected without action by the user and based upon the type of the photosensor-equipped unit connected to the display processing terminal device,
  wherein the display portion is set by default so that the side where said photosensor-equipped unit has been connected becomes an upper direction or a lower direction when the display processing terminal is connected to said photosensor-equipped unit, and
  wherein in accordance with the type of said photosensor-equipped unit to which the display processing terminal device has been connected, the screen display control portion sets by default whether a side of connecting said photosensor-equipped unit becomes an upper side or a lower side in said screen display direction.

8. The photometric system according to claim 7,
wherein said photosensor is an illumination photometry sensor, and
wherein said transmission information includes display direction direct instruction information instructing that the side where said photosensor-equipped unit is mounted becomes an upper direction of a display screen of said display portion.

9. The photometric system according to claim 7,
wherein said photosensor is a color measuring sensor, and
wherein said transmission information includes display direction direct instruction information instructing that the side where said photosensor-equipped unit is mounted becomes a lower direction of a display screen of said display portion.

10. The photometric system according to claim 7,
wherein said transmission information includes photosensor identification information for identifying a type of said photosensor in said photosensor-equipped unit,
wherein said display processing terminal device further includes a direction determination information holding portion that holds display direction determination information for determining a screen display direction of said display portion when the display processing terminal device is connected to said photosensor-equipped unit, and
wherein said screen display control portion determines an instruction content of said display direction determination information based upon said photosensor identification information, and executes said display direction setting process during connection to the photosensor-equipped unit.

11. The photometric system according to claim 7, wherein said display processing terminal device further includes a display direction changing portion configured to change said screen display direction after said display direction setting process to another display direction, when the display processing terminal device is connected to said photosensor-equipped unit.

* * * * *